Figure 1:
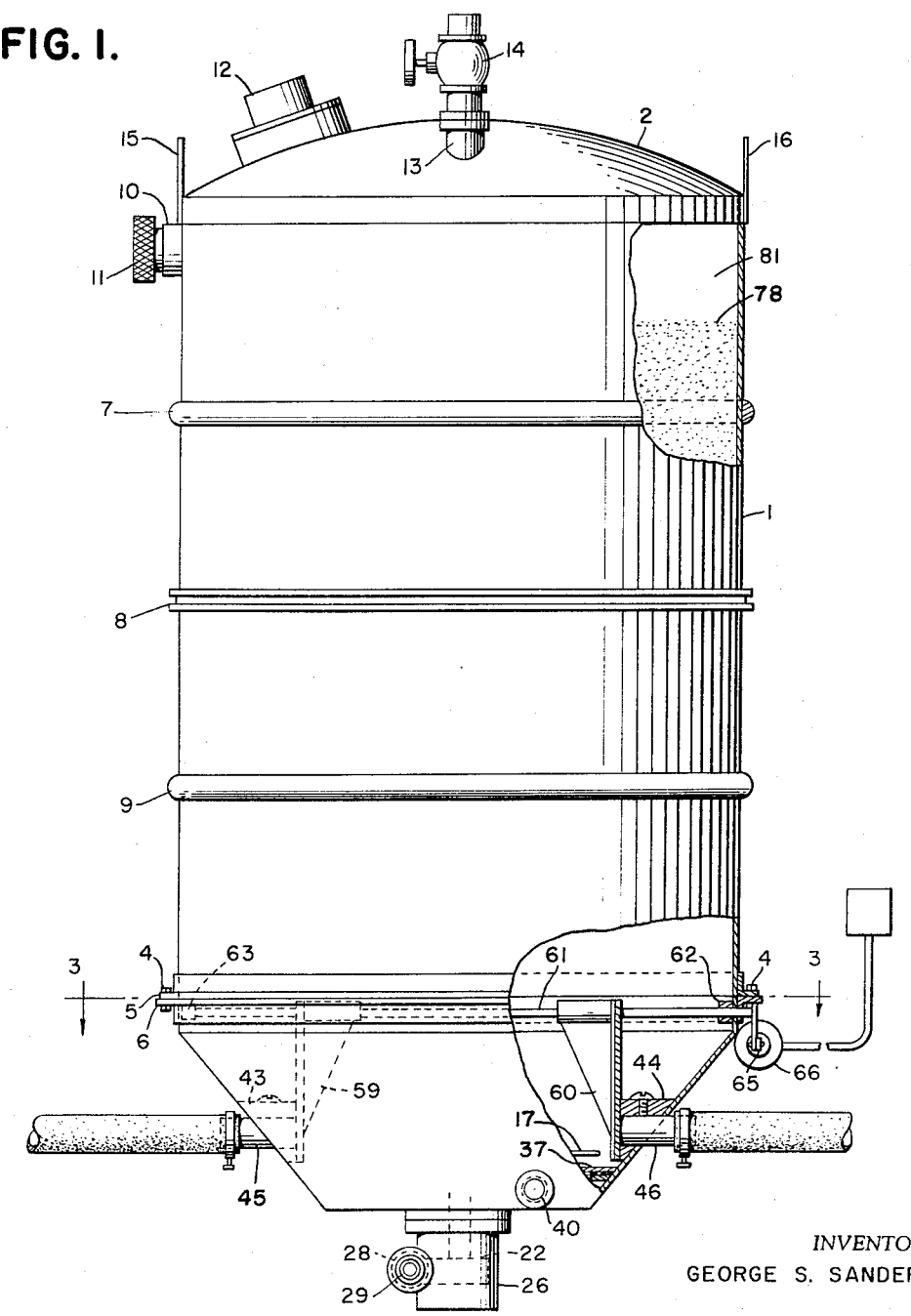
Figure 2:
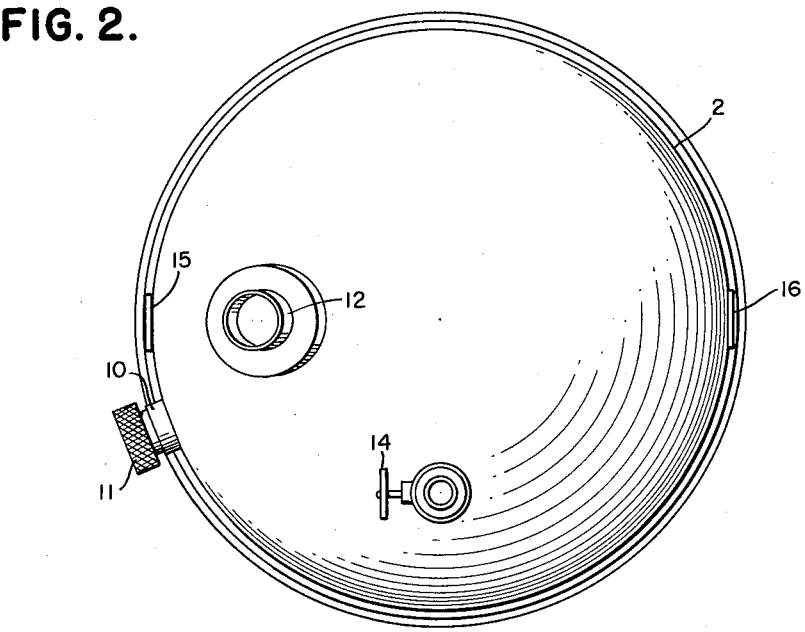
Figure 3:
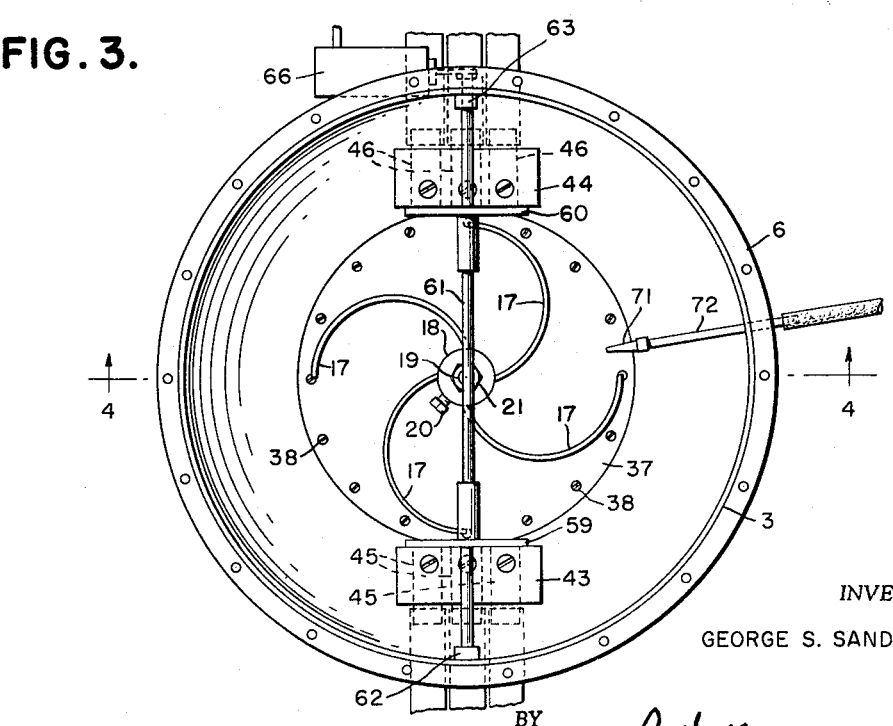
Figure 4:
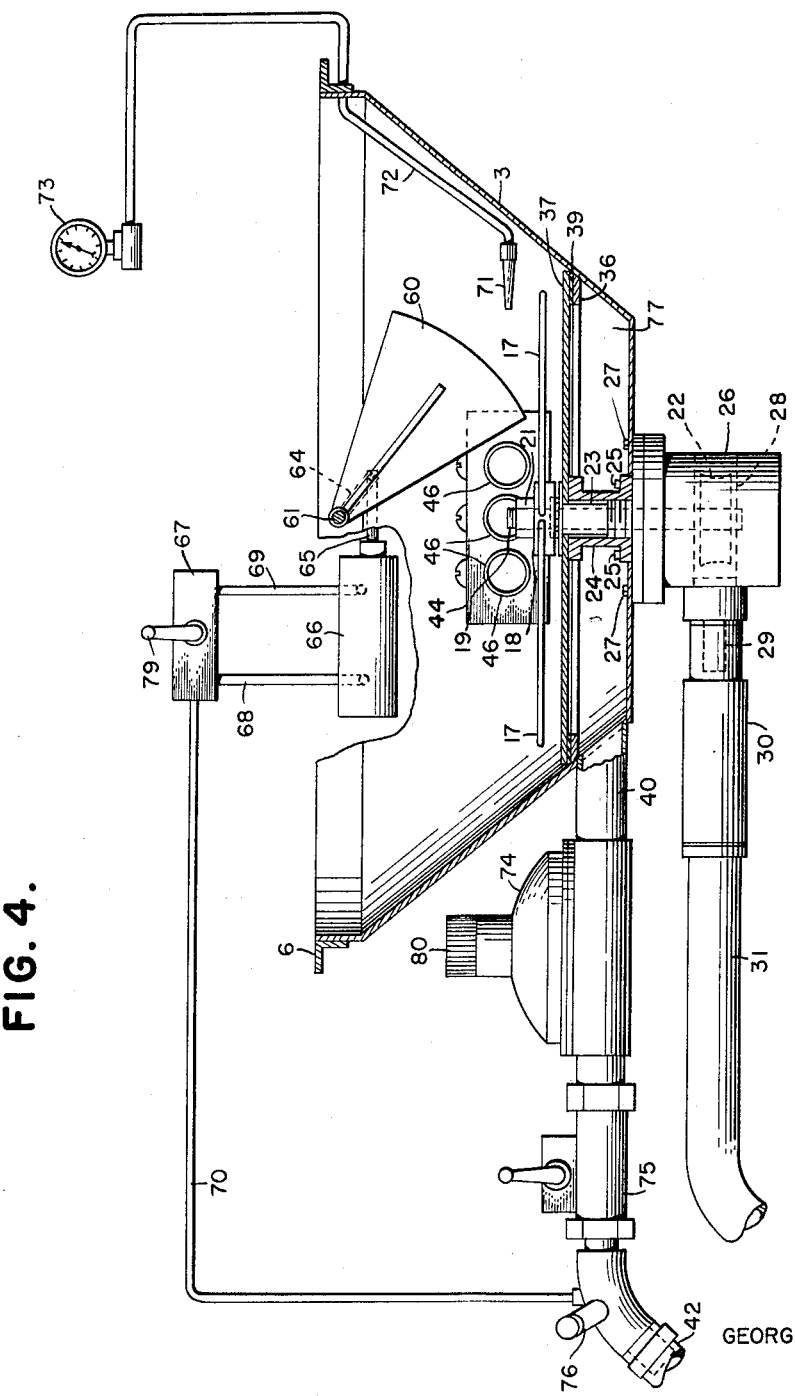
Figure 5:
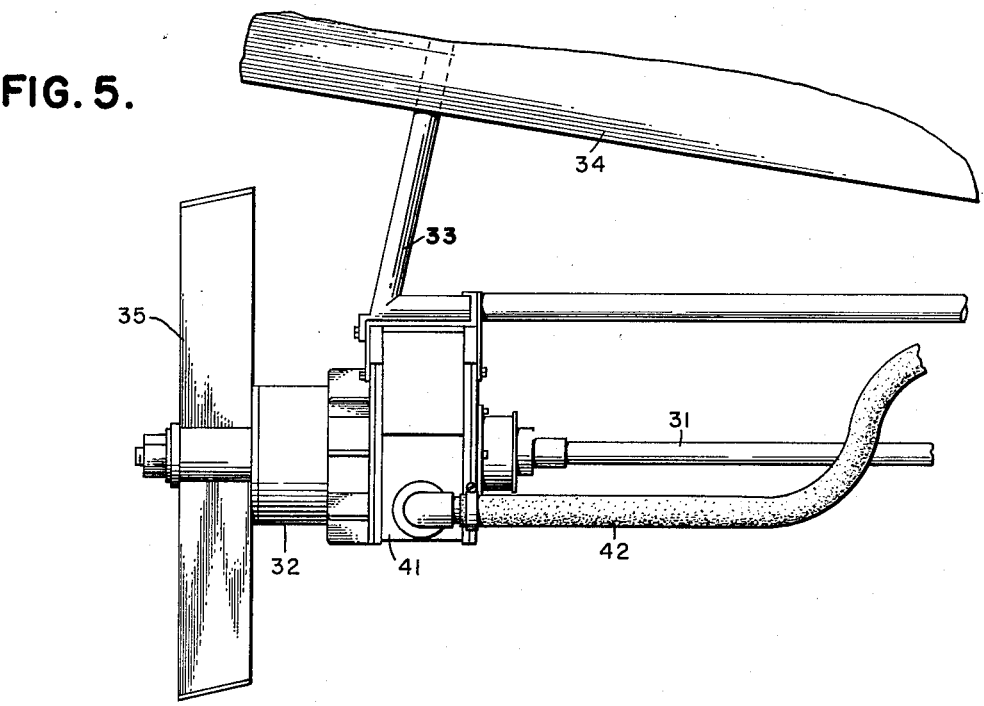
Figure 6:
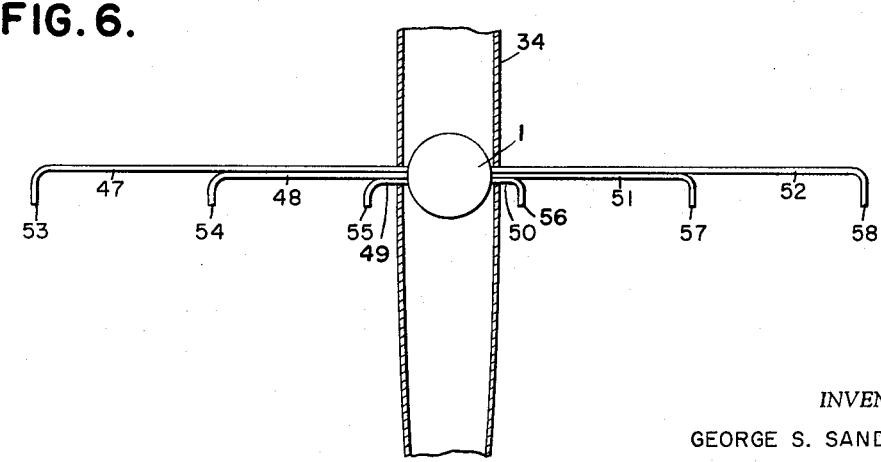

Nov. 1, 1960   G. S. SANDERS   2,958,154
DUST METERING APPARATUS FOR AGRICULTURAL AIRCRAFT
Filed June 19, 1959   4 Sheets-Sheet 1

FIG. I.

INVENTOR
GEORGE S. SANDERS

BY   R. Hoffman

ATTORNEY

Nov. 1, 1960     G. S. SANDERS     2,958,154
DUST METERING APPARATUS FOR AGRICULTURAL AIRCRAFT
Filed June 19, 1959     4 Sheets-Sheet 2

INVENTOR
GEORGE S. SANDERS
BY R. Hoffman
ATTORNEY

Nov. 1, 1960　　　　G. S. SANDERS　　　　2,958,154
DUST METERING APPARATUS FOR AGRICULTURAL AIRCRAFT
Filed June 19, 1959　　　　　　　　　　4 Sheets-Sheet 4

INVENTOR
GEORGE S. SANDERS

BY
*R. Hoffman*
ATTORNEY

United States Patent Office 2,958,154
Patented Nov. 1, 1960

2,958,154

DUST METERING APPARATUS FOR AGRICULTURAL AIRCRAFT

George S. Sanders, Sunnyvale, Calif., assignor to Agricultural Aviation Engineering Company Filed June 19, 1959, Ser. No. 821,616

4 Claims. (Cl. 43—147)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to agricultural aircraft equipment used to distribute pesticide powders or dusts on lands and crops. More particularly, the invention relates to apparatus to be carried in an aircraft for fluidizing a mass of pesticide dust and then ejecting it in a controlled manner where desired.

When a stream of gas is blown upward through a bed of finely-pulverized material a velocity is reached at which the powdered material becomes suspended in the gas and assumes the characteristics of liquid. This is known as "fluidizing."

One object of the present invention is to provide an apparatus mountable on an aircraft and capable of fluidizing a mass of pesticide dust. Another object is to provide such an apparatus which is capable of accurately metering and distributing a fluidized pesticide dust to a plurality of laterally located nozzles on the aircraft so as to result in a more uniform and complete deposit pattern. A further object is to provide an apparatus having simple, positive, and easily adjusted controls for metering and distributing pesticide dusts to desired positions of release.

These and other objects which will be apparent to those skilled in the art are accomplished by the apparatus described in the following specification and in the accompanying drawings in which:

Figure 1 represents an elevation of the tank, partly in section, for holding and fluidizing the dust, and partially shows the means for controlling the amount of dust delivered to the spraying nozzles;

Figure 2 is a plan view of the tank showing the filling means, safety diaphragm, and vent;

Figure 3 is a plan view taken on line 3—3 of Figure 1 showing the means for mechanically agitating the dust and the metering valves;

Figure 4 is an elevation of a section on line 4—4 of Figure 3 showing the contents of the bottom portion of the tank;

Figure 5 shows the means, mounted on the fuselage of an aircraft, for supplying the fluidizing air and for agitating the dust; and Figure 6 is a schematic showing of a preferred arrangement of the nozzles through which the dust is distributed.

In accordance with this invention, the dust fluidizer consists of a tank or hopper having a shell 1 provided with dished head 2 welded above it, and conical fluidizing assembly 3 bolted to it below by means of bolts 4. For bolting purposes there are provided flanges 5 and 6 on tank 1 and fluidizing assembly 3, respectively. Since the apparatus is to be used in an aircraft it is preferably constructed of aluminum to make it as light as possible. The metal should be sufficiently thick, however, to withstand an internal pressure of 15 p.s.i. with a safety factor of 12.

To provide additional strength, shell 1 is reinforced about its circumference by three uniformly spaced rings 7, 8, and 9. Suitable material for these rings may be half-oval extruded aluminum stock for rings 7 and 9 and extruded aluminum channel for ring 8. At the top of the shell, at a convenient location, a standard aluminum coupling 10 is welded just below head 2 and is provided with a threaded cap 11 for filling purposes. Welded to head 2 itself are a conventional rupture disc 12 and an aluminum pipe coupling 13. A needle valve 14 for controlling the amount of air vented or bled from the tank is connected to coupling 13. At opposite ends of a diameter of head 2 are secured a pair of brackets 15 and 16 for mounting the apparatus inside the aircraft. These brackets may, of course be located at any other appropriate places when necessary.

The conical portion 3, the lower section of the tank, embodies the major feature of the invention. An agitator constructed of four spirally-shaped rods 17 is mounted on a rigid hub 18 which is secured to threaded agitator shaft 19 by means of set screw 20 and retaining nut 21. The agitator shaft 19, which also is the shaft of worm gear 22, is housed within bushing 23 which is screwed into spacer 24. Spacer 24 is bolted to the bottom of conical member 3 by means of bolts 25. Worm gear 22 and worm 28 are mounted inside housing 26 which is secured to the bottom of conical member 3 by means of machine screws 27.

Worm 28 is mounted on shaft 29, the end of which protrudes from housing 26 and is connected by means of coupling 30 to flexible drive shaft 31. The other end of the drive shaft is connected to windmill 32 which is mounted by means of bracket 33 beneath the fueslage 34 of the aircraft and in front of the landing gear (not shown). In flight power is provided by rotation of windmill propeller 35.

A short distance above the bottom of conical member 3 and inside thereof there is welded or otherwise secured a mounting ring 36. To this ring a porous plate 37 is secured by means of screws 38. A rubber gasket 39 provides a seal between the porous plate and the mounting ring. Porous plate 37 is preferably made of sintered bronze particles, and is permeable to liquids, gases, and smokes.

Air is introduced into the space between the bottom of the conical member and porous plate 37 through inlet pipe 40 which is connected to pump 41 on windmill 32 by means of hose 42. Above the porous plate are two banks of outlets 43 and 44 consisting of three short pipes 45 and 46 each. Each pipe is connected by means of a tube to a separate nozzle mounted under the wing (not shown) of the aircraft and disposed laterally to the direction of flight. As shown in Figure 6, the tubes are represented by 47, 48, 49, 50, 51, and 52 and the nozzles by 53, 54, 55, 56 57, and 58. Each one of outlet banks 43 and 44 is provided with a flow control gate 59 and 60, respectively. The surface of each gate which is in contact with the outlet means may be covered with a layer of felt bonded to the gate. These flow control gates are mounted on a common rotatable shaft 61 pivoted in bearings 62 and 63 inside the conical member. Shaft 61 extends outside the wall of conical member 3 and is connected to lever 64 which in turn is connected to piston 65 of air-operated cylinder 66. Cylinder 66 is connected to remote control pneumatic valve 67 by means of tubes 68 and 69. Pressured air for operating the cylinder is supplied to valve 67 through tube 70 which is tapped into air line 42 coming from windmill 32.

A porous bronze thimble 71 made of the same material as porous plate 37 is located inside the conical member at a point level with outlet pipes 45 and 46. The thimble is soldered to a copper tube 72 which extends outside the conical member and is connected to pressure gage 73 mounted on the instrument panel (not shown) of the aircraft. In this manner the pilot can read the actual air pressure at the level of the outlets.

To control and regulate the fluidization of the dust, a pressure controller 74, a shut-off valve 75, and a pressure relief valve 76 are connected between air inlet pipe 40 and air hose 42.

In the operation of the apparatus during flight air is metered into chamber 77 formed by the bottom of conical member 3 and porous air-diffusing plate 37. As the air flows up through the dust contained in the tank above plate 37, the dust expands in volume until it reaches a fluidized state in which it exhibits liquid-like charcteristics and has an upper free surface 78. It is desirable to maintain sufficient head space 81 above surface 78 to permit disengagement of entrained particles. When the air pressure is regulated to maintain the dust in this state, the dust will flow through outlets 45 and 46 under the applied pneumatic pressure maintained at the bottom of the tank. In accordance with hydraulic principles, the rate of flow through the outlets is governed by the control pressure maintained in the tank at the outlet level and resistance to flow exhibited by the conveying tube system.

Pressure regulator 74 is of a conventional type designed to be responsive to the volume of air flow and thus to maintain a predetermined constant pressure in the tank independently of the head of fluidized dust at any time during operation of the apparatus. The rate of air flow is initially adjusted, with gates 59 and 60 closed, to a minumum value necessary to fluidize the dust in the tank. This is done by adjusting needle valve 14 at the top of the tank to bleed off enough air so that a fluid-like mass is maintained. Once this condition has been achieved flow of dust may be started by rotating gates 59 and 60 so that they do not cover openings 43 and 44. This is accomplished by proper manipulation of handle 79 on control valve 67 which supplies air to the proper end of pneumatic cylinder 66. With the openings uncovered an increase of air flow through regulator 74 takes place and dust is conveyed through tubes 47, 48, 49, 50, 51, and 52 to nozzles 53, 54, 55, 56, 57, 58, respectively. The rate of air flow through the regulator is proportional to the volume of fluidized dust being conveyed plus the constant amount of air being bled from the top of the tank. During flow, agitator rods 17 rotate in the dust and prevent the formation of localized air channels under the conditions of low initial fluidizing air flow rates.

The sizes of the several components will naturally depend upon the type of aircraft in which the apparatus is to be installed. Thus, where installation is to be in a Piper J-3, a tank 29 inches high has been found to be satisfactory. Since the windmill propeller 35 is directly mounted on the air pump shaft the former should rotate at no less than 2000 r.p.m. in order that the pump provide sufficient air for the potential maximum requirements. The windmill should therefore be adjusted to provide at least 2000 r.p.m. at minimum intended flying speeds. Greater rotational speeds of the air pump will provide an excess of air which will be bypassed from the system through pressure relief valve 76.

A speed of 133 r.p.m. of the agitator has been found satisfactory to cause proper agitation and prevent channeling in the bed of fluidized dust. At 2000 r.p.m. of the windmill, a worm gear reduction of 15 to 1 will provide the desired number of revolutions of the agitator. Rotational speeds higher than 133 r.p.m. have no apparent effect on the performance of the fluidizer, although lower speeds would cause channel formation and would adversely affect fluidization.

The tank may be filled by removing cap 11, attaching a hose to coupling 10, and conveying the dust in a fluidized stated from some storage source. When the tank has been filled cap 11 is replaced and the controls are adjusted to predetermined values for a calibrated flow rate. Flight operation may now begin. During flight, air supply valve 75 is open and the dust will be fluidized under the controlled pressure adjusted at pressure regulator 74.

Flow of dust is started by setting control valve 67 of pneumatic cylinder 66 to the "open" position. The control valve should be located at some convenient place near the pilot. On completion of the dusting run flow is discontinued by reversing the action of the control valve 67 to close gates 59 and 60. The amount of dust sprayed from the nozzles is determined by the pressure in tank 1 which in turn is regulated by adjusting pressure controller 74. A greater pressure will cause a greater flow of fluidized dust. These adjustments can be quickly made by manipulating pressure adjusting screw 80 on control valve 74 to give the desired flow.

I claim:

1. Apparatus for distributing a pesticide dust comprising a closed container for holding such dust; air inlet means for supplying a stream of fluidizing air to a bottom portion of said container; means for regulating the pressure of said stream of fluidizing air; agitating means in said bottom portion of the container for mechanically agitating dust contained therein; outlet means for conveying fluidized dust from said bottom portion of the container; air diffusing means situated between said air inlet means and said outlet means; means for opening and closing said outlet means; and means for determining air pressure at the level of said outlet means.

2. Apparatus for distributing a pesticide dust comprising a closed tank for holding such dust; an upper portion of said tank having closable dust inlet means, pressure relief means, and adjustable air-bleeding means; a bottom portion of said tank containing air inlet means, outlet means, externally driven mechanical agitating means, externally operated means for opening and closing said outlet means, air-diffusing means situated between said air inlet means and said outlet means, and externally connected pressure sensing means; air supply means for supplying a stream of pressurized fluidizing air to said air inlet means; means in said air supply means for regulating the air pressure; and means for controlling said opening and closing means.

3. Apparatus for distributing a pesticide dust comprising a closed tank for holding a pesticide dust; an upper portion of said tank provided with closable dust inlet means, pressure relief means, and adjustable air-bleeding means; a bottom portion of said tank provided with air inlet means, outlet means, externally driven mechanical agitating means, externally operated means for opening and closing said outlet means, air-diffusing means situated between said air inlet means and said outlet means, and externally connected pressure sensing means; common means for supplying a stream of pressurized fluidizing air to said air inlet means and for driving said agitating means; pressure control means connected to said air inlet means sensitive to changes in air pressure within the tank for controlling and regulating the pressure of the air supplied to said inlet means, said pressure control means being adapted to permit increased flow of air to said air inlet means when the aforesaid outlet means is open; and pneumatic means external to the tank for operating the aforesaid opening and closing means.

4. Apparatus for distributing a finely-divided material comprising a closed tank adapted to be mounted on an aircraft for holding finely divided material, said tank having an upper portion provided with closable material inlet means, pressure relief means, and adjustable air-bleeding means, said tank further having a bottom portion containing air inlet means, material outlet means, externally driven mechanical agitating means, externally operated means for opening and closing said material outlet means, air-diffusing means situated between said air inlet means and said material outlet means, and externally connected pressure sensing means; means adapted to be mounted on an aircraft for supplying a stream of pressurized fluidizing air to said air inlet means and for driving said agitating means; pressure control means connected to said air supplying means sensitive to changes in air pressure within the tank for controlling and regulating the pressure of the air supplied to said air inlet means, said pressure control means being adapted to permit increased flow of air to said air inlet means when the material outlet means is open; means external to said tank for operating the opening and closing means on the material outlet means; and means connected to the air supplying means adapted to relieve pressure in said air supplying means when the pressure therein rises above a predetermined value.

References Cited in the file of this patent

UNITED STATES PATENTS

| | | |
|---|---|---|
| 1,691,205 | Morse | Nov. 13, 1928 |
| 2,123,537 | Marr | July 12, 1938 |
| 2,316,814 | Schemm | Apr. 20, 1943 |
| 2,539,816 | Denlinger | Jan. 30, 1951 |